United States Patent [19]

Anzai et al.

[11] Patent Number: 5,210,740
[45] Date of Patent: May 11, 1993

[54] LINE SWITCHING EQUIPMENT FOR SWITCHING A PERSONAL LINE TO A BACKUP ISDN LINE

[75] Inventors: Takeo Anzai; Shigeyuki Mitani; Tomohiro Kuroda, all of Tokyo, Japan

[73] Assignee: NEC Corporation, Tokyo, Japan

[21] Appl. No.: 717,833

[22] Filed: Jun. 21, 1991

[30] Foreign Application Priority Data

Jun. 21, 1990 [JP] Japan ................................ 2-163801
Jul. 31, 1990 [JP] Japan ................................ 2-202661

[51] Int. Cl.$^5$ ........................ H04J 3/02; H04L 12/26; H04M 3/22
[52] U.S. Cl. .................................... 370/16; 370/13; 370/58.2; 379/94; 379/221; 371/8.2; 371/11.2
[58] Field of Search ................. 370/16, 13, 110.1, 58.1, 370/58.2; 379/93, 94, 221; 371/8.1, 8.2, 11.1, 11.2, 20.1

[56] References Cited

U.S. PATENT DOCUMENTS

| | | | |
|---|---|---|---|
| 4,119,815 | 10/1978 | Frankfort et al. | 379/221 |
| 4,989,202 | 1/1991 | Soto et al. | 370/13 |
| 4,998,240 | 3/1991 | Williams | 370/13 |
| 5,033,079 | 7/1991 | Catron et al. | 379/94 |
| 5,051,979 | 9/1991 | Chaudhuri et al. | 370/16 |
| 5,051,992 | 9/1991 | Taniguchi et al. | 370/110.1 |

Primary Examiner—Douglas W. Olms
Assistant Examiner—Min Jung
Attorney, Agent, or Firm—Foley & Lardner

[57] ABSTRACT

A terminal adapter portion sends and receives data of a data processing unit such as a data terminal device and information of a control portion through an ISDN line. The control portion responds to an externally supplied switching instruction to send switching instruction information to another line switching equipment or receive the information therefrom, through the ISDN line and to control a switching portion. The switching portion switches the data terminal device to either a personal line or the ISDN line depending upon the switching instruction. With this construction, it is possible to perform line switching control of two mutually opposing line switching equipments from either of them. Further, it comprises a line test portion for testing a line and a switching portion for switching the line test portion to either a personal line which is not connected to the data terminal device or the ISDN line, so that it is possible to easily perform a test of the personal line or the ISDN line without degrading on-line data communication.

9 Claims, 11 Drawing Sheets

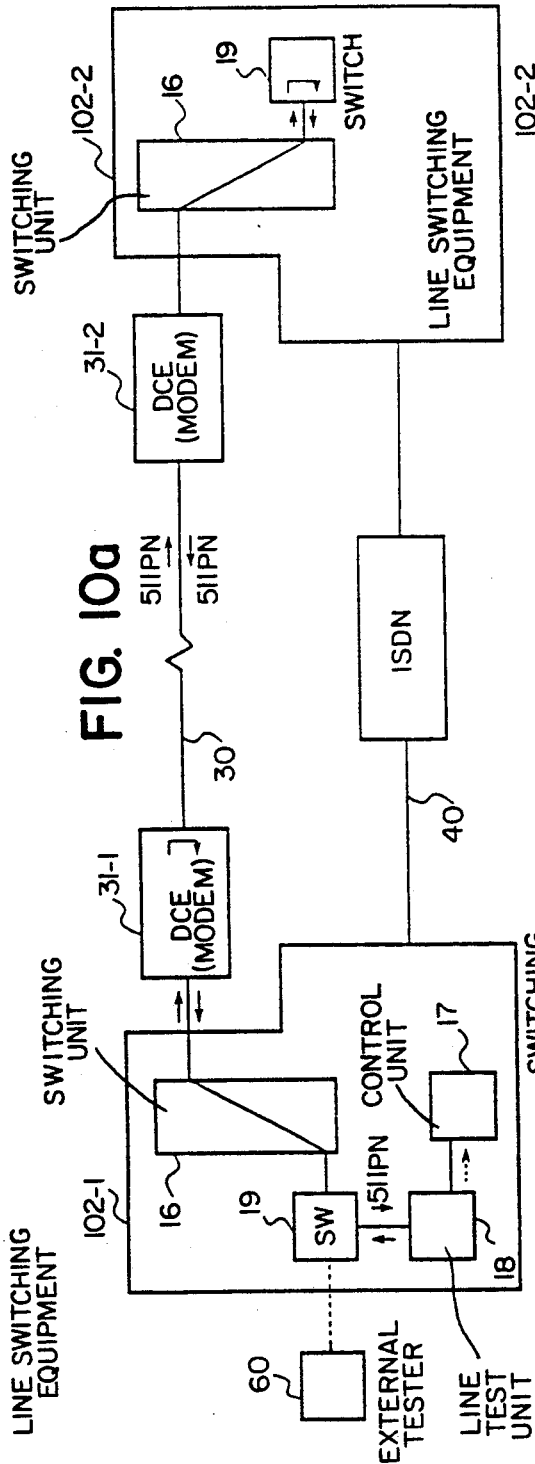
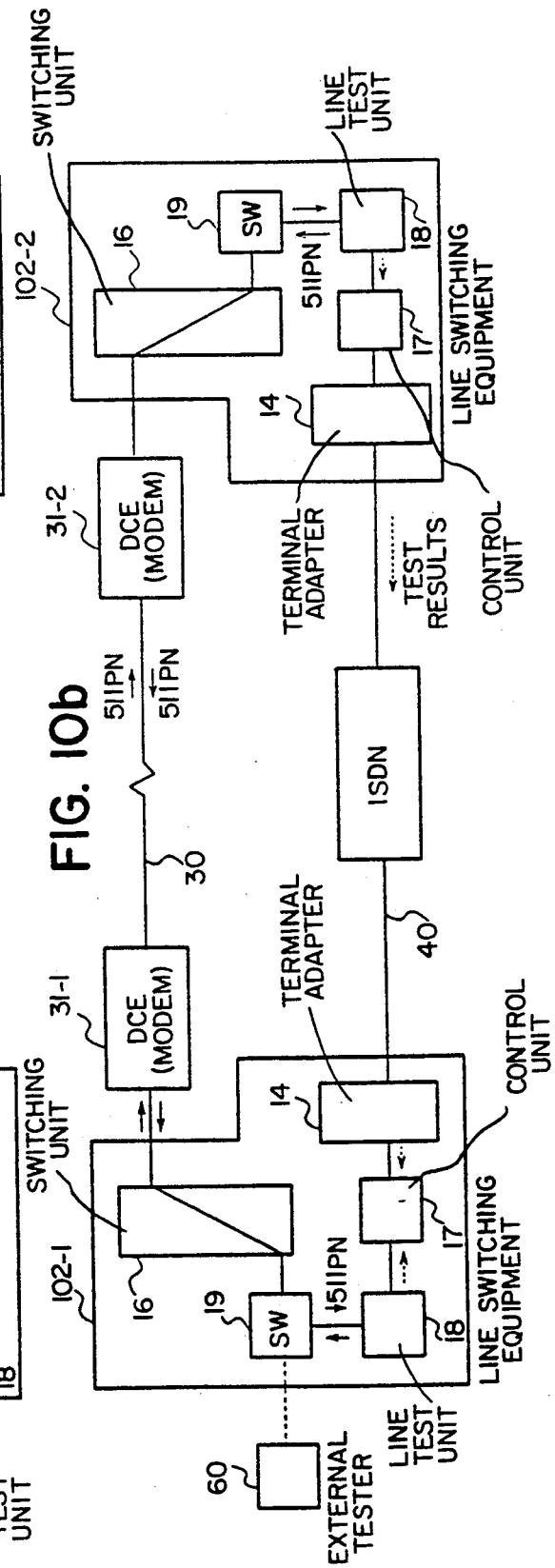
FIG. 10a
FIG. 10b

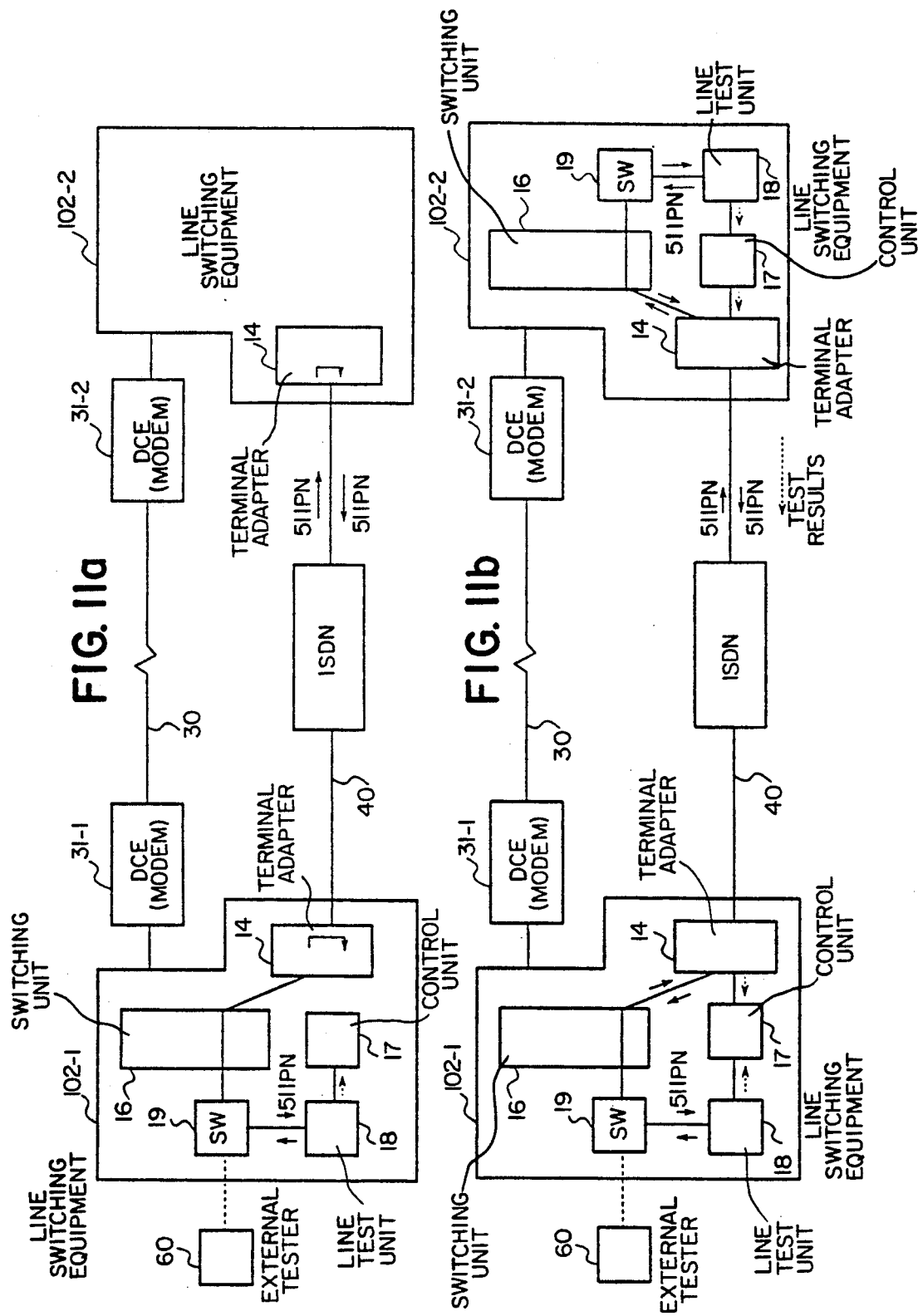

LINE SWITCHING EQUIPMENT FOR SWITCHING A PERSONAL LINE TO A BACKUP ISDN LINE

BACKGROUND OF THE INVENTION (1) Field of the Invention

The present invention relates to line switching equipment and, particularly, to line switching equipment to be used in a data communication system including a personal line and a backup ISDN line, for switching the personal line to the backup ISDN line when a failure of the personal line occurs.

(2) Description of the Prior Art

Conventionally, line switching equipment for backup purpose of a personal line selectively connects data terminal equipment to data circuit terminating equipment (DCE) of a personal line or an ISDN terminal adapter of an ISDN line. The line switching equipment comprises a DTE interface portion coupled to the DTE, a DCE interface portion connected to the DCE, a terminal adapter interface portion connected to the ISDN terminal adapter, a switching portion for switching the DTE interface portion for switching the DTE interface portion to either the DCE interface portion or the terminal adapter interface portion and a control portion controlling the switching portion manually.

In a data communication system having such line switching equipment as mentioned above, when an operator on the local side detects failure of the personal line, he operates a switch of the ISDN terminal adapter on the local side to send a call therethrough to connect it to an ISDN terminal adapter connected to the line switching equipment on the remote side. When the operators on the both sides recognize that the line switching equipment on both sides have been connected to each other through the ISDN, they manually operate the control portions of the respective line switching equipment to signal a switching request to the respective switching portions. Upon this signal, the line switching equipment on the both sides switches the connections of the respective data terminal equipment from the personal line side to the ISDN line side to establish a backup network using the ISDN.

The conventional line switching equipment mentioned above, however, requires a human operator on each side for the manual switching operation, and the procedure necessary to establish the backup system is complicated and time-consuming. Further, ISDN terminal adapters are necessary to use the ISDN. In addition, it is impossible to send control information and/or alarm information during data communication through the ISDN circuit.

BRIEF SUMMARY OF THE INVENTION (1) Object of the Invention

An object of the present invention is to provide line switching equipment in which the procedure necessary to establish a backup system using an ISDN circuit is simplified and the necessity of having a human operator on the remote side is eliminated by automating the line switching on the remote side.

Another object of the invention is to provide line switching equipment by which a line test of a personal line and an ISDN line test can be done easily without having an adverse effect on data transmission.

A further object of the present invention is to provide line switching equipment in which a single external control device can easily perform line switching control and circuit test control even in a complicated data communication system including a plurality of personal lines in each side.

(2) Summary of the Invention

Line switching equipment of the present invention comprises a DTE interface portion connected to a data processing device. A DCE interface portion is connected to data circuit terminating equipment of a personal line. A terminal adapter portion is connected to an ISDN line for controlling call sending and call receiving with respect to the ISDN line and for interface-converting an input data signal and an input control signal to produce a resultant signal. A switching portion selectively connects the DTE interface portion to either the DCE interface portion or the terminal adapter portion. A control circuit is responsive to control information supplied externally and a control signal supplied by the ISDN line through the terminal adapter portion for controlling an operation of the terminal adapter portion and the switching portion to send a control signal to the ISDN line through the terminal adapter portion.

A pair of line switching equipment each constructed according to the present invention is used in a data communication system including data processing devices such as data terminal equipment and/or host computers, etc., arranged in facing relation to each other through personal lines. In an event such as failure of the personal line, the control circuit of the line switching equipment in one side which receives a switching instruction controls the control circuit of the other line switching equipment through the terminal adapter portion and the ISDN line to switch connections of the respective switching portions to thereby automate backup by means of the ISDN line.

The line switching equipment according to the present invention may further comprise a line test portion for performing a personal line test through the DCE interface portion and an ISDN line test through the terminal adapter portion, a first switch circuit provided in the switching portion for connecting the DTE interface portion to either the DCE interface portion or the terminal adapter portion and a second switch circuit for connecting the line test portion to either the DCE interface portion or the terminal adapter portion. With these switch circuits, the control circuit can also control operation of the line test portion. Thus, during on-line data communication between the data processing devices, it is possible to perform a line test without disconnecting the data circuit terminating equipment and/or the ISDN line, by connecting the line test portion to the personal line or the ISDN line which is off-lined.

Preferably, the terminal adapter portion is constructed such that control information for the control circuit and managing information such as failure, switching hysterisis, etc., are transmitted and received in a control channel which constitutes, together with a data channel, a frame structure of a B channel of a basic interface of the ISDN circuit, while transmitting and receiving data of the data processing device in the data channel.

Preferably, there is provided a test circuit switching circuit which can perform a line test by means of either an internal line test means or an external line test means.

Preferably, the control means on one side includes an external control interface portion which is cascade-connected to the control circuit of the other line switching device and connectable to an external control device.

Preferably, the control means on each side is constructed such that, when on one side it recognizes that a designation identifying number of a signal from the external control device is equal to that identifying the other side line switching equipment, the one side control means transfers that signal to the other side line switching equipment through the ISDN line.

Preferably, a first data return circuit is provided between the switching portion and the line test portion and a second data return circuit is provided in the terminal adapter portion so that the test data can be returned during the circuit test.

Preferably, the DCE interface portion comprises a monitor circuit for monitoring a state of communication through the personal line of the data processing device connected to the DCE interface portion and for informing the control circuit of detection of communication failure. The control circuit responds to the information of communication failure to perform a backup with the ISDN line, to cause the line test portion to perform a test of the personal line and, when a result of the test is recognized as preferable, return communication to the personal line.

BRIEF DESCRIPTION OF THE DRAWINGS

The above-mentioned and other objects, features and advantages of the present invention will become more apparent by reference to the following detailed description of the invention taken in conjunction with the accompanying drawings, wherein:

FIGS. 10a and 10b are block circuit diagrams showing a personal line test construction using the line switching equipment each shown in FIG. 5; and FIGS. 11a and 11b are block diagrams showing a ISDN line test construction using the line switching equipment each shown in FIG. 5.

DETAILED DESCRIPTION OF PREFERRED EMBODIMENTS

Figure 1:
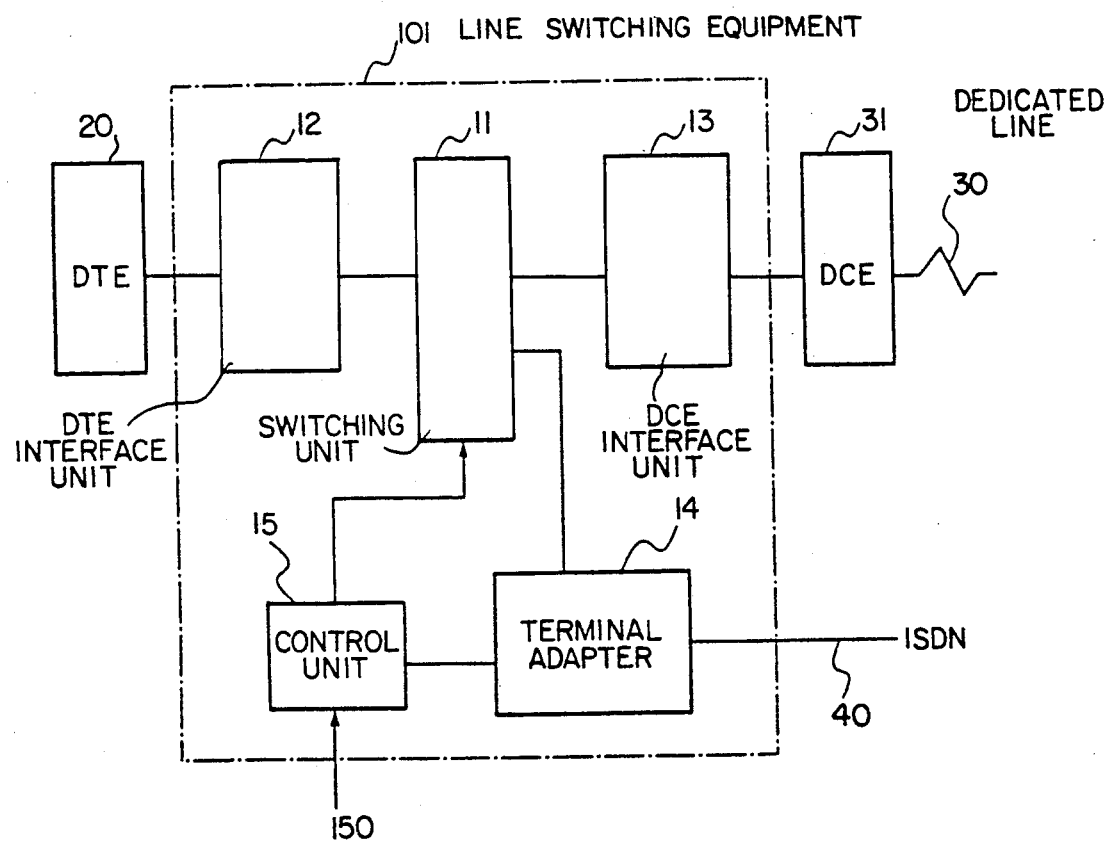
FIG. 1 is a schematic block diagram of line switching equipment according to a first embodiment of the present invention.

Referring to FIG. 1. Line switching equipment 101 according to a first embodiment of the present invention comprises a DTE interface portion 12 connected to a data terminal equipment (referred to as DTE hereinafter) 20. A data circuit terminating equipment (referred to as DCE hereinafter) interface portion 13 is connected to a DCE 31 of a personal line 30. A terminal adapter portion 14 is connected to an ISDN line 40. A switching portion 11 is connected to the DTE interface portion 12. the switching portion 11 connects the DTE interface portion 12 to either the DCE interface portion 13 or the terminal adapter portion 14. A control portion 15 is responsive to control information supplied externally (150) or from the terminal adapter portion 14 to control operations of the terminal adapter portion 14 and the switching portion 11. The terminal adapter portion 14 performs, under control of the control portion 15, a call sending control and a call receiving control with respect to the ISDN, to interface-convert a signal of the DTE 20 inputted through the switching portion 11 and transmit it together with control and managing information of the control portion 15 to the ISDN line 40. Further, the terminal adapter portion 14 converts the data signal and control signal received from the ISDN circuit 40 and sends the data signal to the DTE 20 through the switching portion 11 and the DTE interface portion 12 and the control signal to the control portion 15. The data signal and control signal are digital signals.

Figure 2:
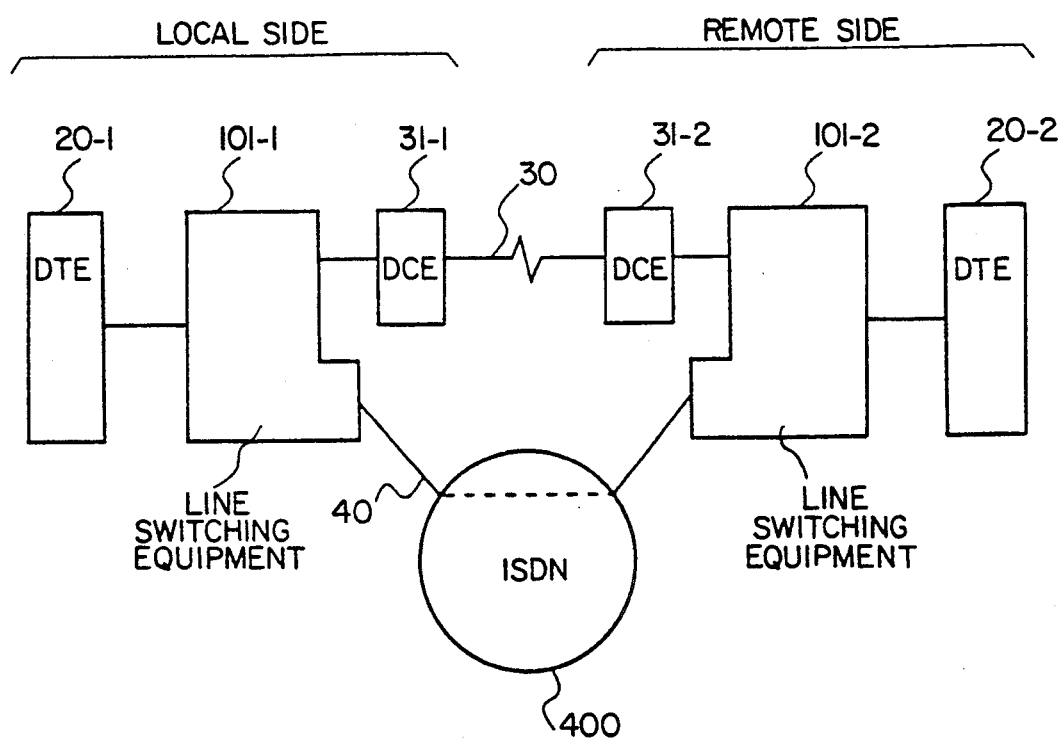
FIG. 2 is a schematic block circuit diagram of an example of a data communication system in which the line switching equipment shown in FIG. 1 is incorporated.

FIG. 2 shows a data communication system using this line switching equipment 101, an operation of which will be described with reference to FIG. 1.

Normally, a DTE 20-1 on a local side and a DTE 20-2 on remote side perform a data communication with each other using a personal line 30 through line switching equipment 101-1 and 101-2 and DCEs 31-1 and 31-2, respectively. It is assumed that the DTEs 20-1 and 20-2 have, for example, V.24 or V.35 interfaces.

When it is decided that there is a failure in data communication on the personal line 30 for any reason, an operator may externally (150) operate a switch of an operating portion of the local line switching equipment 101-1, which is not shown, manually, in order to back it up with an ISDN 400. The control portion 15 of the line switching equipment 101-1 controls the terminal adapter portion 14 to send a call to the remote side line switching equipment 101-2 through the ISDN line 40 including a digital line terminating equipment (not shown) and the IDSN 400. When the terminal adapter portion 14 confirms that it is connected to the remote side line switching equipment 101-2 through the ISDN line 40, it sends a notice of completion of connection to the control portion 15. The control portion 15 responds to the notice to send control information such as transmit/receive control and switching control to the control portion 15 of the remote side line switching equipment 101-2 through the terminal adapter portion 14 and the ISDN line 40.

The remote line switching equipment 101-2 responds to the control information received by the control portion 15 to instruct the terminal adapter portion 14 to perform data transmit/receive control. Thereafter, the DTE 20-2 is connected to the ISDN line 40 by connecting the back-up network using the ISDN line 40 to the terminal adapter portion 14. When the control portion 15 of the remote side line switching equipment 101-2 confirms a completion of switching to the ISDN line 40, it sends a switching completion notice to the local side line switching equipment 101-1 through the terminal adapter portion 14 and the ISDN line 40.

When the control portion 15 of the local side line switching equipment 101-1 confirms the switching completion notice sent from the remote side line switching equipment 101-2 to the ISDN line 40, it sends a switching instruction to the switching portion 11 to connect the DTE interface portion 12 to the terminal adapter portion 14 to thereby connect the DTE 20-1 to the ISDN line 40. Thereafter, data communication is performed between the DTEs 20-1 and 20-2 on the back-up network using the ISDN line 40 of the ISDN 400.

When the failure is removed from the personal line 30 and the operator decides that there is no problem in performing data communication, the operator manipulates the switch of the operating portion of the local side line switching equipment 101-1 externally (150) to order removal of the back-up. The control portion 15 of the line switching equipment 101-1 controls the terminal adapter portion 14 to send a control information of back-up removal to the control portion 15 of the remote side line switching equipment 101-2 through the ISDN line 40.

When the remote side line switching equipment 101-2 receives the control information of back-up removal, the control portion 15 thereof provides a switching instruction to the switching portion 11. The switching portion 11 connects the DTE interface portion 12 to the DCE interface portion 13 to thereby connect the DTE 20-2 to the personal line 30. When the control portion 15 of the remote side line switching equipment 101-2 confirms that switching to the personal line 30 is complete, it sends a notice of back-up removal completion to the local side line switching equipment 101-1 through the terminal portion 14 and the ISDN line 40 and sends a request for disconnecting the ISDN line 40 to the terminal adapter portion 14.

When the control portion 15 of the local side line switching equipment 101-1 confirms the reception of the back-up removal completion nitice from the remote side line switching equipment 101-2, it sends a switching instruction to the switching portion 11 to connect the DTE interface portion 12 to the DCE interface portion 13 to thereby connect the DTE 20-1 to the personal line 30. Thereafter, it is returned to data communication using the personal line 30.

Figure 3A:
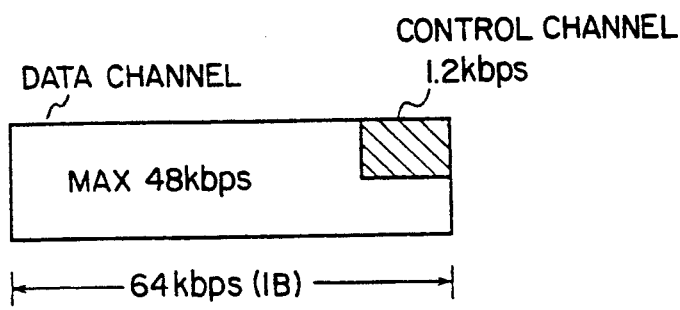
FIGS. 3a, 3b and 3c show examples of frame structure of a B channel of an ISDN basic interface according to the present invention.
Figure 3B:
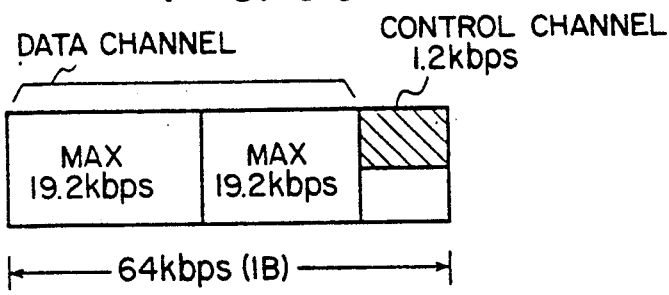
Figure 3C:
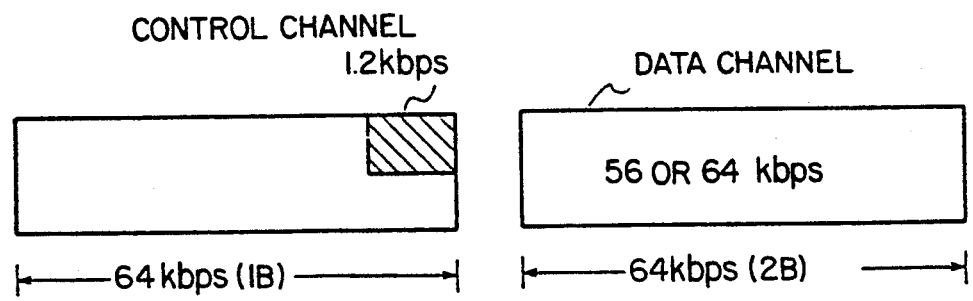

The ISDN line 40 is a basic interface. Although the call sending and request of disconnection with respect to the ISDN 400 is performed through the D channel, the control information of the control portions 15 of the line switching equipment 101-1 and 101-2 and the managing information such as failure and switching hysterisis, etc., are multiplexed with data of the data terminal equipment (DTE) 20 by the terminal adapter portions 14 and transmitted/received through a B channel, as shown in FIGS. 3a, 3b and 3c. A frame structure of the B channel is based on the X.50 frame of the CCITT recommendation in which it is separated into a data channel region and a control channel region so that it is possible to insert control/management information and parity information for path-monitor, of 1.2 Kbps, while transmitting data of 48 Kbps.

FIG. 3a shows a case where one channel is used for data of 48 Kbps at the maximum.

FIG. 3b shows a case where 2 channels are used for data of 19.2 Kbps at the maximum (2 DTEs are connected to one personal line).

FIG. 3c shows a case where one channel is used for data of 56 Kbps or 64 Kbps. In this case, two 3 channels are used, one being for control/management information and the other being for data.

Figure 4:
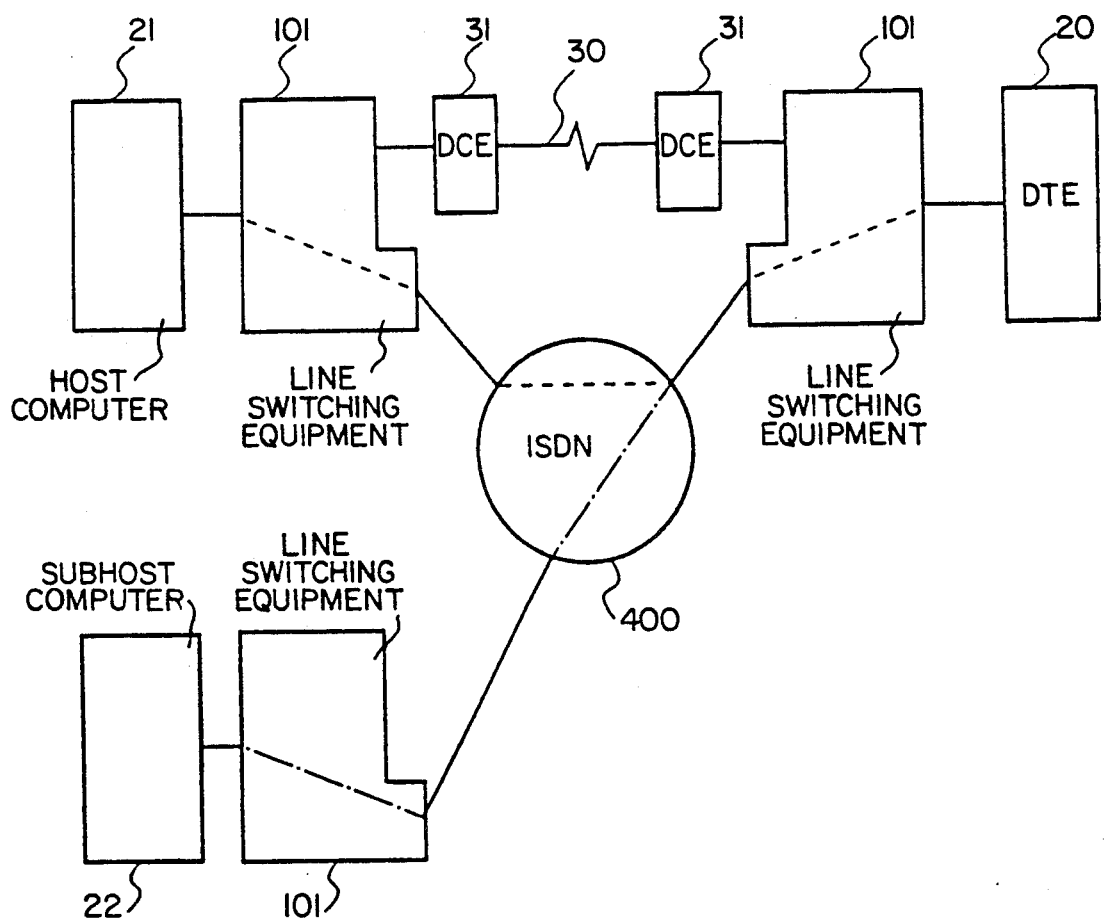
FIG. 4 is a schematic block circuit diagram showing another example of the data communication system in which the line switching equipment shown in FIG. 1 is incorporated.

A computer may be substituted for the data terminal equipment (DTE) of the line switching equipment. FIG. 4 shows an example of such a data communication system.

This system comprises a host computer 21 and a sub-host computer 22 which have the same information. When a failure occurs on a personal line 30 between the host computer 21 and the DTE 20, the ISDN 400 backs up the line. When the host computer 21 itself malfunctions, the line switching equipment 101 on the side of the host computer 21 is operated to send a call to the line switching equipment 101 on the side of the DTE 20 to back up the line between the DTE 20 and the sub-host computer 22 by means of the ISDN 400.

As mentioned, the line switching equipment of the first embodiment has a function similar to that of the ISDN terminal adapter which has been conventionally connected externally. The first embodiment achieves the following advantages:

(1) The procedure necessary for establishment of a back up is easier and the time necessary therefor is shorter than the conventional system.
(2) Since automatic call-receive and automatic switching are possible, the operator on the remote side becomes unnecessary.
(3) The ISDN terminal adapter which used to be attached externally becomes unnecessary.
(4) It is possible to provide notification of control information or alarm information even during data communication.

Although the first embodiment of the present invention has such advantages as mentioned above, it still has the following problems as to a circuit test.

That is, it is impossible to perform a test on the side of the ISDN line 40 including the terminal adapter portion 14 when the DTE 20 is in communication through the personal line 30. When it is necessary to test the ISDN line 40 from the DTE 20, an on-line data communication on the side of the personal line 30 must be stopped, otherwise, a test can be performed in a direction from a junction to the terminal adapter portion 14 to the ISDN line 40. That is, it is impossible to test the terminal adapter portion 14. In a case where the DTE 20 is switched to the side of the ISDN line 40 and a test of the personal line 30 including the data line terminating equipment (DCE) 31 is to be performed, the DCE interface portion and the DCE 31 are disconnected from each other. Further, in this case, the same test device as that used on the side of the ISDN line 40 can not be used since the interfaces are different. Further, when a data communication system is constructed with a plurality of lines arranged correspondingly, it is difficult to control this system line by line and a line by line test is very time consuming.

Line switching equipment of a second embodiment of the present invention solves the above-mentioned problems.

Figure 5:
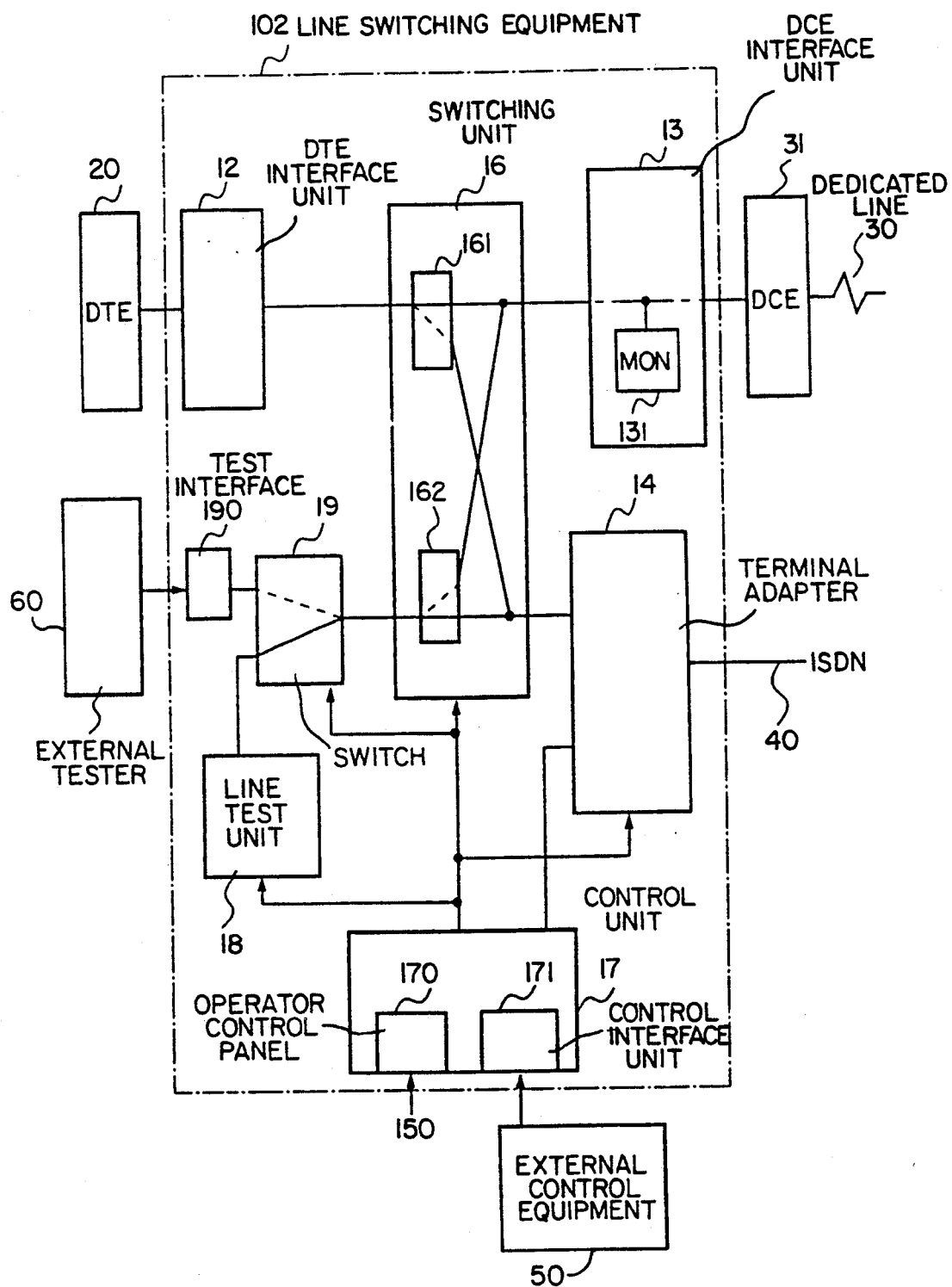
FIG. 5 is a schematic block circuit diagram showing line switching equipment according to a second embodiment of the present invention.

Referring to FIG. 5, the line switching equipment 102 of the second embodiment comprises a DTE interface portion 12 connected to a data terminal equipment (DTE) 20. A DCE interface portion 13 is connected to data line terminating equipment (DCE) 31 of a personal line 30. A terminal adapter portion 14 is connected to an ISDN 40 and operates in the same way as that mentioned with respect to FIG. 1. A line test portion 18 tests both the personal line 30 including the DCE 31 through the DCE interface portion 13 and the ISDN line 40 through the terminal adapter portion 14. A switching portion 16 has a switch circuit 161 for connecting the DTE interface portion 12 to either the DCE interface portion 13 or the terminal adapter portion 14 and a switch circuit 162 for switching the line test portion 18 to either the DCE interface portion 13 or the terminal adapter portion 14. A test device switching circuit 19 connects either the line test portion 18 or the external test interface portion 190 to the switch circuit 162 of the switching portion 16 and a control portion 17. The control portion 17 comprises an operation portion 170 for receiving a manual control operation instruction supplied externally (150), an external control interface portion 171 supplied by an external control device 50 with a control operation instruction and the terminal adapter portion 14. The control portion 17 controls operations of the terminal adapter portion 14, the line test portion 18, the test device switching circuit 19 and the switching portion 16.

When the personal line 30 is a line for an analog signal, the DCE 31 is a modem, and the line test portion 18 and the external test device 60 to be used have modem test functions, respectively. Further, the DTE 20 may be a host computer.

Normally, the DTE 20 is connected through the DTE interface portion 12 of the line switching equipment 102, the switch circuit 161 of the switching portion 16 and the DCE interface portion 13 to the DCE 31, and communicates with another DTE through the personal line 30. On the other hand, an ISDN including an ISDN line 40 for back up purposes is connected to the terminal adapter portion 14. An interface on the DTE side of the terminal adapter portion 14 is switched by the switching portion 16 between the DTE interface portion 12 and the test device switching circuit 19.

The switching control between the personal line 30 and the ISDN line 40 in this line switching equipment 102 is performed in a similar manner to that of the line switching equipment 101 shown in FIG. 1. Further, the B channel frame structure of the ISDN line 40 is similar to those shown in FIGS. 3a, 3b and 3c. Therefore, detailed explanation thereof is omitted.

Figure 6:
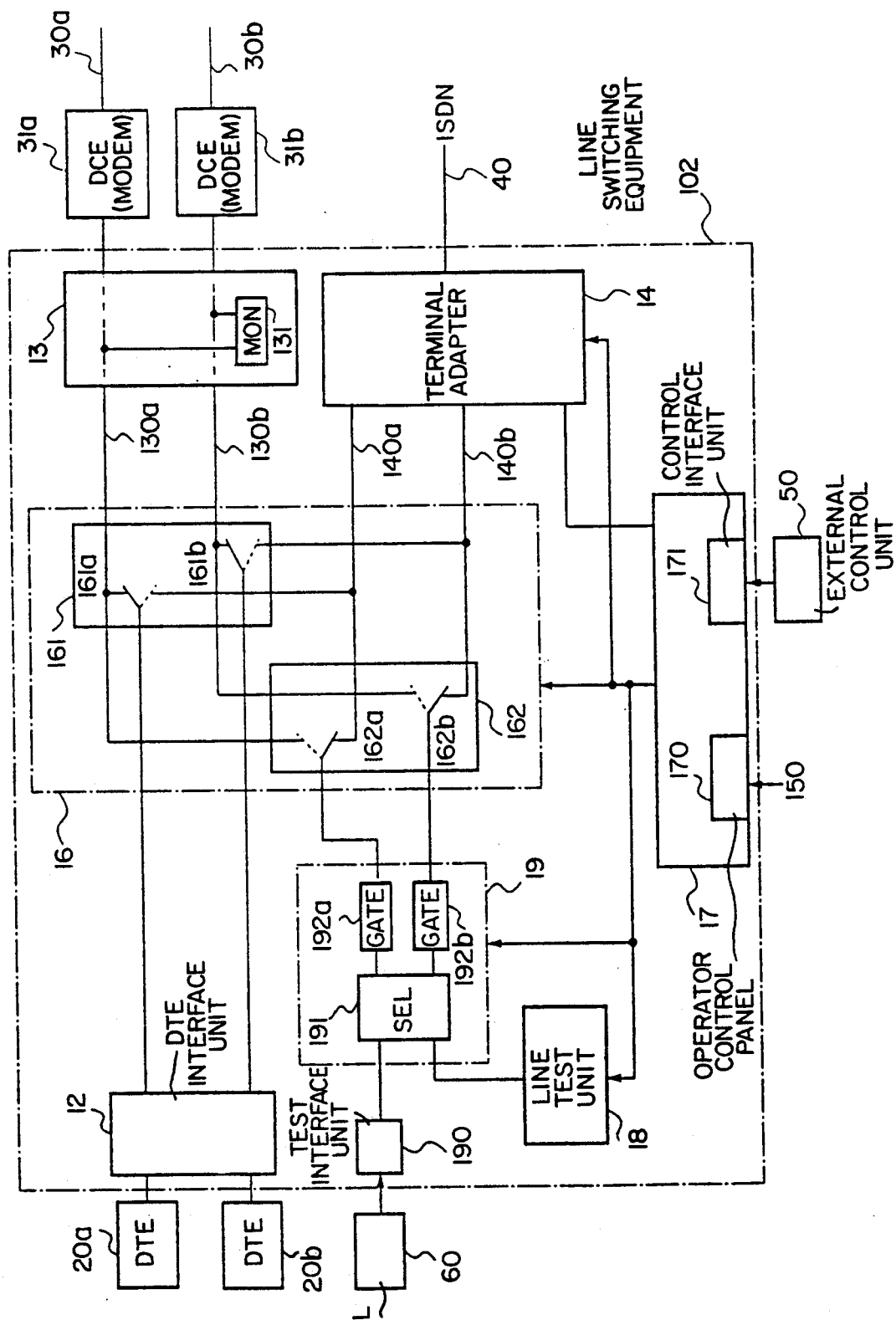
FIG. 6 is a block diagram showing a construction of line switching equipment according to a third embodiment of the present invention to be used to be backup a couple of personal lines.

In the line switching equipment 102, a single ISDN line can back up not only a single personal line 30 but also a plurality of personal lines. FIG. 6 shows a case where two analog signal personal lines 30a and 30b are backed up. Operations of respective portions will be described in detail with reference to FIG. 6.

The terminal adapter portion 14 has two DTE interfaces 140a and 140b for lines 130a and 130b between a DTE 20a and a DCE (MODEM) 31a and between a DTE 20b and a DCE (MODEM) 31b, respectively. The switching portion 16 is constructed such that the DTEs 20a and 20b are connected, by means of transfer relay contacts 161a and 161b of the switch circuit 161, to either the DCEs (MODEMs) 31a and 31b, respectively, or the DTE interfaces 140a and 140b of the terminal adapter portion 14, respectively. On the other hand, transfer relay contacts 162a and 162b of the switch circuit 162 operate in a completely reverse manner to the transfer relay contacts 161a and 161b to connect the test device switching circuit 19 to either the DTE interfaces 140a and 140b of the terminal adapter portion 14 or the DCEs (MODEMs) 31a and 31b connected to the DCE interface portion 13, respectively. That is, when the DTEs 20a and 20b are connected to the DCEs (MODEMs) 31a and 31b, the test device switching circuit 19 is connected to the terminal adapter portion 14 and when the DTEs 20a and 20b are connected to the terminal adapter portion 14, the test device switching circuit 19 is connected to the DCEs (MODEMs) 31a and 31b.

Figure 7:
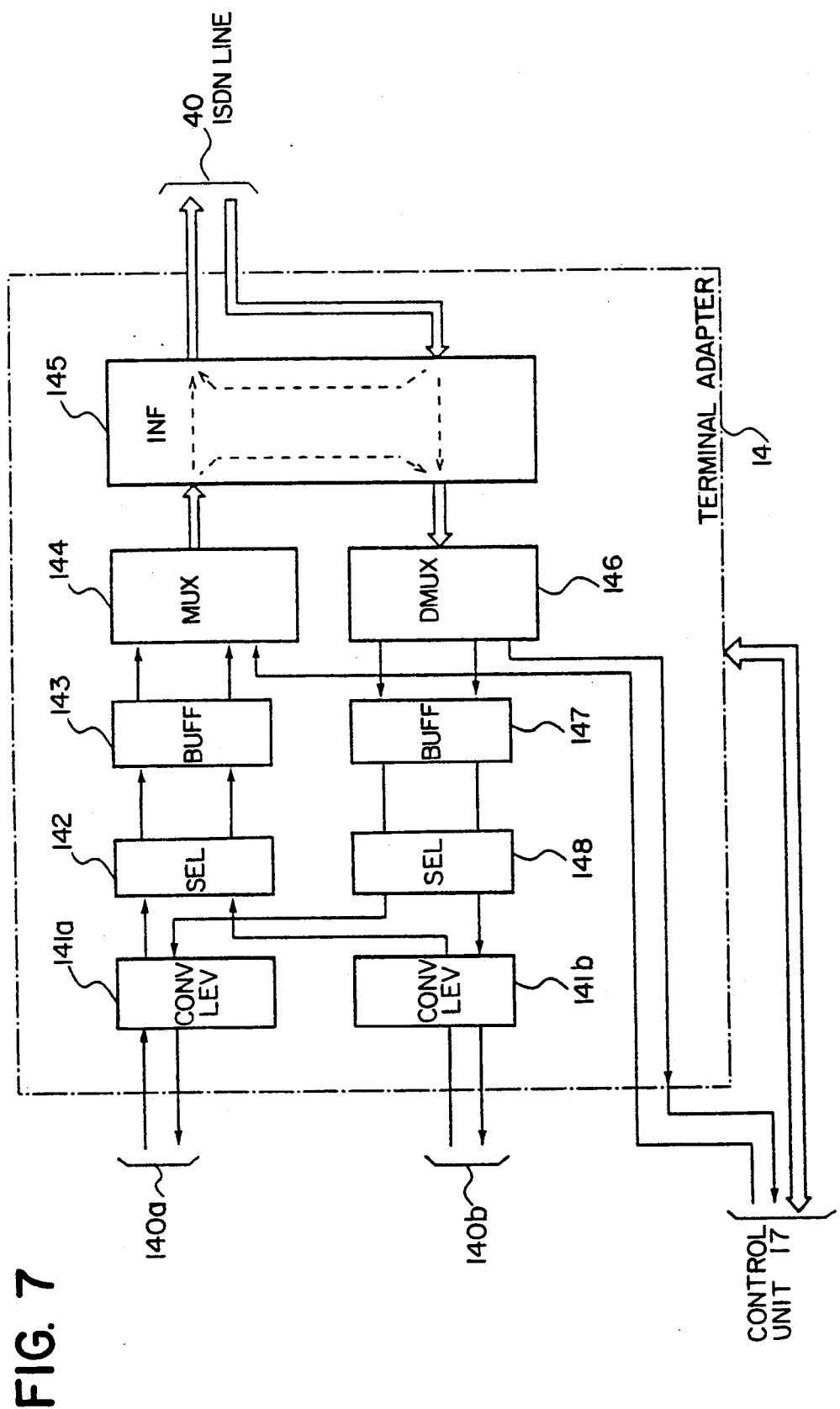
FIG. 7 is a block circuit diagram showing a construction of an example of a terminal adapter portion shown in FIG. 6, in detail.

FIG. 7 shows the detailed construction of a data processing portion in the terminal adapter portion 14. The terminal adapter portion 14 converts the level of input data from the DTE interfaces 140a and 140b by level converter circuits (LEVCONVs) 141a and 141b, respectively. A selector (SEL) 142 decides whether or not its input connection is to be made. The output of the selection circuit is passed through a buffer circuit (BUFF) 143. A multiplexer 144 multiplexes the output of the buffer 143 with control/management information from the control portion 17 to an X.50 frame format and transmits the multiplexed signal through an ISDN interface circuit (INF) 145 to the ISDN line 40. In the terminal adapter portion 14 in FIGS. 1 or 5, there is only one input and thus either 141a or 141b is omitted. A signal from the ISDN line 40 through the INF 145 is separated from data and control/management information by means of a demultiplexer (DMUX) 146 and the control/management information is transmitted to the control portion 17. The data thus separated is passed through a buffer (BUFF) 147 to a selector (SEL) 148 to decide whether or not an output connection is to be made. The output of the selector 148 is level-converted by the level converter circuits (LEVCONs) 141a and 141b and transmitted to the corresponding DTE interfaces 140a and 140b, respectively. The INF 145 has a loop back circuit by which data from the transmitting side is returned thereto according to a control signal from the control portion 17. The INF 145 has a call sending control function and a call receive control function with respect to the ISDN.

Returning to FIG. 6, the test device switching circuit 19 includes a selector (SEL) 191 controlled by a control signal from the control portion 17. This SEL 191 selects either one of the transfer relay contacts 162a and 162b constituting the switch circuit 162 of the switching portion 16 and connects the selected one to either the external test interface portion 190 connected to the external test device 60 (modem tester) or the line test portion 18 including the modem tester. The test device switching circuit 19 includes loop back circuits 192a and 192b. The circuits 192a and 192b are connected between the SEL 191 and the transfer relay contacts 162a and 162b, respectively, and, according to a control signal from the control portion 17, through-connect data from the switching portion 16 to the SEL 191 or return them to the switching portion 16.

Figure 8:
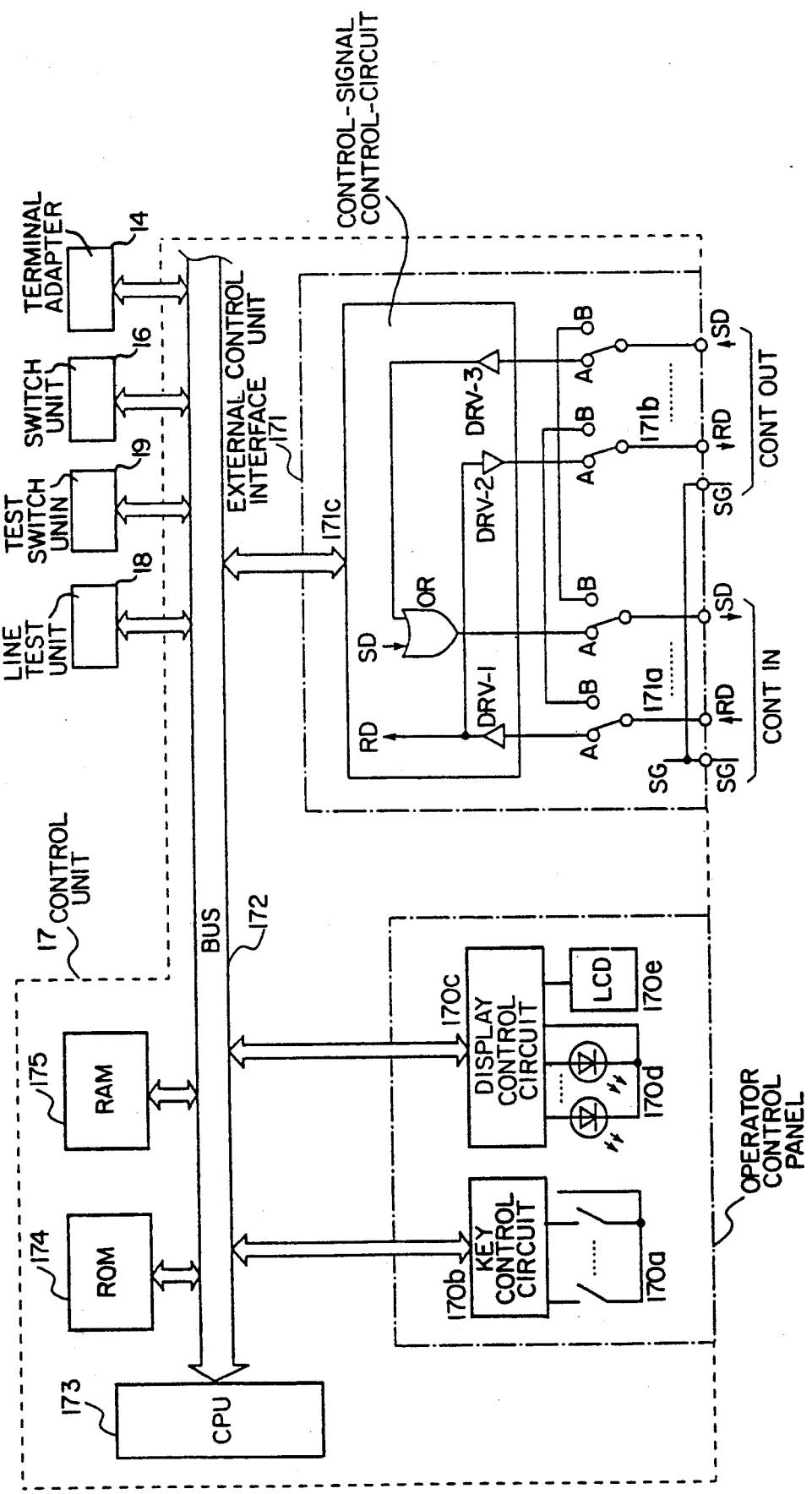
FIG. 8 is a block circuit diagram showing a construction of an example of a control portion shown in FIGS. 5 or 6, in detail.

FIG. 8 shows the control portion 17 in detail. The control portion 17 comprises a CPU 173 for controlling overall control operation. A ROM 174 stores programs and data necessary for control operation of the CPU 173. A RAM 175 stores data to be processed by the CPU 173. An input operation portion 170 inputs a manual control operation instruction supplied externally. An external control interface portion 171 is supplied with a control operation instruction from the external control device 50 (FIGS. 5 and 6). A bus 172 is composed of a data bus and an address bus for mutually interconnecting the respective portions mentioned above. The reference numerals 14, 18, 19 and 16 denote the terminal adapter portion, the line test portion, the test device switching circuit and the switching portion, respectively.

The operation portion 170 includes a plurality of key switches 170a including ten keys for numerical input and function keys for selecting and assigning various functions, a key control circuit 170b for connecting the key switches 170a to the bus 172 and transfering input information to the CPU 173, a display control circuit 170c connected to the bus 172 for receiving display information from the CPU 173, light emitting diodes (LEDs) 170d for displaying display information from the display control circuit 170c and a liquid crystal display circuit (LCD) 170e for displaying characters according to display information.

The LEDs 170d and the LCDs 170e display setting information of the line switching equipment 102, failure information, various device conditions such as back-up execution and test execution, etc., and communication condition. By inputting through the key switches 170a, telephone numbers, various settings, control commands according to display information, line back up control, the line test control using external or internal modem tester are performed by the CPU 173.

The external control interface portion 171 includes connection terminals (CONTIN) for connection to external control devices, connection terminals (CONT-OUT) for cascade-connection to other line switching equipment, a control signal control circuit 171c for connecting a signal from the CONTIN to the bus 172 and to the CONTOUT, ORing the signal from the CONTIN and the bus 172 and connecting it to the CONTIN and a plurality of relay contacts 171a and 171b for connecting the CONTIN through the control signal control circuit 171c to the CONTOUT or connecting the CONTIN directly to the CONTOUT.

When the line switching equipment 102 is to be cascade-connected to second line switching equipment, it is sufficient to connect the CONTOUT of the line switching equipment 102 to a CONTIN of the second line switching equipment through an interface cable (not shown). When there is third line switching equipment, the CONTOUT of the second line switching equipment is connected to a CONTIN of the third line switching equipment.

Among interface signals between the CONTIN and an external control device, interface signals other than signal ground (SG), for example, receive data (RD), carrier send (CS), carrier detection (CD), data set ready (DR), call indication (CI), send data to external control device (SD), request send (RS), data end ready (ER), from the external control device, are connected to the CONTOUT thorough the relay contacts 171a and 171b connected to the B side when the line switching equipment 102 is inoperable, i.e., power switch is off. When the line switching equipment 102 is operable, the relay contacts 171a and 171b are connected to the A side and the various signals mentioned above are connected to the control signal control circuit 171c. In this state, the receive data (RD) supplied by the external control device to the CONTIN is passed through the relay contact 171a to an interface driver DRV-1 of the control signal control circuit 171c, transferred to the CPU 173 through the bus 172, sent through an interface driver DRV-2 and the relay contact 171b to the CONTOUT and becomes receive data (RD) for the second line switching equipment. On the other hand, the send data (SD) supplied to the CONTOUT from the second line switching equipment is supplied through the relay contact 171b to an interface driver DRV-3 of the control signal control circuit 171c, ORed by an OR circuit with the send data (SD) transferred from the CPU 173 through the bus 172, sent through the relay contact 171a to the CONTIN and becomes the send data (SD) for the external control device. This is true for other control signals (RS, ER) from the second line switching equipment.

The receive data (RD) and the send data (SD) between the external control device and the line switching equipment 102 can constitute a variable length communication data portion of, for example, about 500 bytes at maximum, and a header portion of, for example, 3 bytes. In the header portion, the type of communication data, identification number (ID) of requester device and identification number (ID) of destination device are set. The line switching equipment 102 takes receive data (RD) received from the external control device into the control portion 17 when the identification number (ID) of the destination device coincides with its own identification number (ID) and performs line back up control or line test control according to the content thereof. Resultant data of the line test is returned to the external control device by means of send data (SD) having its own identification number (ID) as a requester identification number (ID) of the header.

Figure 9:
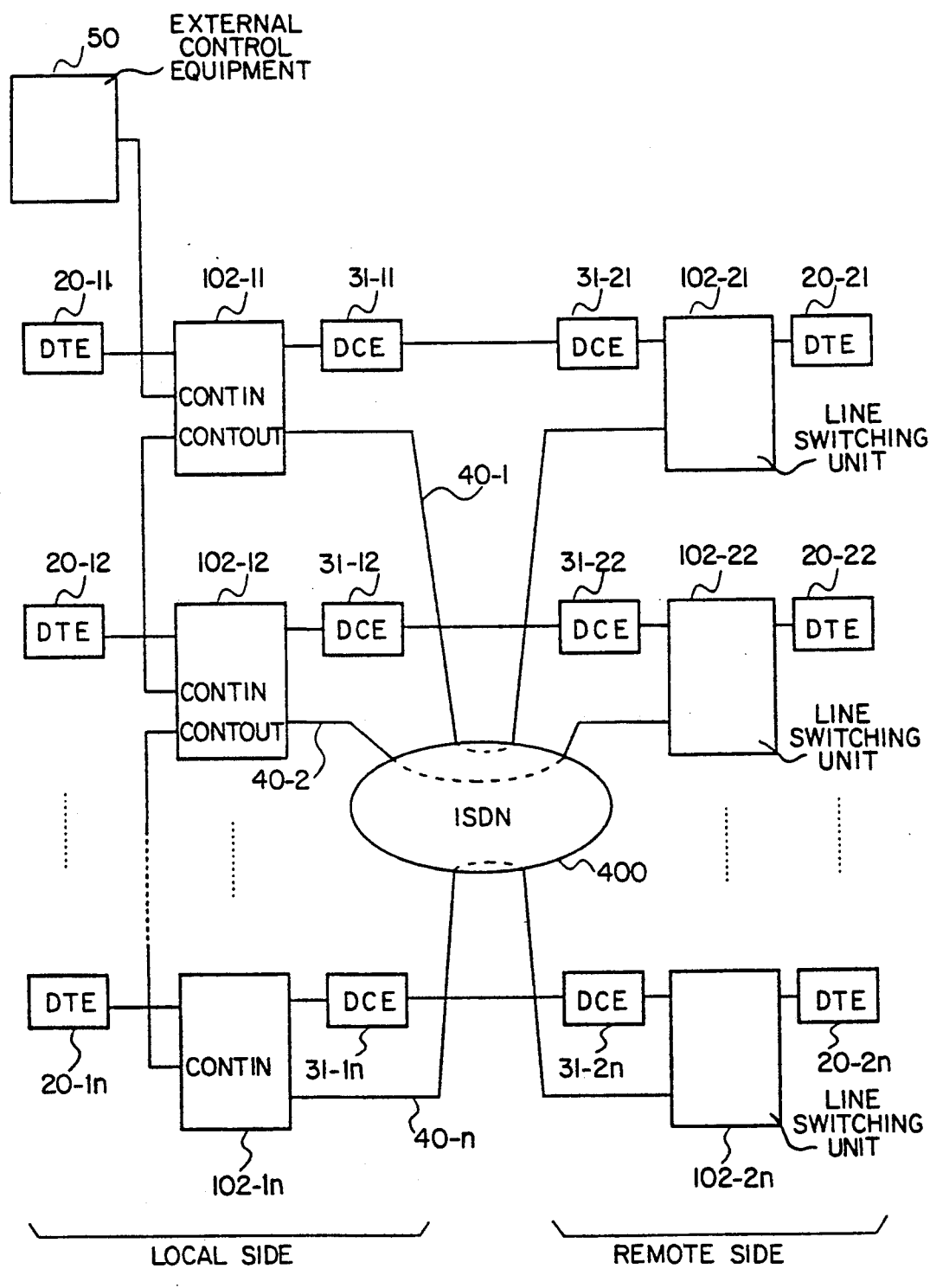
FIG. 9 is a schematic block circuit diagram showing an example of a data communication system using the line switching equipment shown in FIG. 5.

FIG. 9 shows a system construction in which a plurality of pieces of line switching equipment 102 are arranged correspondingly in the local and remote sides, respectively. The line switching equipment 102-11, 102-12, ..., 102-1n arranged in the local side has CONTINs and CONTOUTs of respective external control interface portions 171, which are cascade-connected by interface cables. However, the CONTIN of the first line switching equipment 102-11 is connected to the external control device 50 which controls the whole system. When the identification number (ID) information of each line switching equipment on the local sides uses 7 bits, it is possible to cascade-connect a maximum of 128 pieces of line switching equipment.

On the other hand, although the line switching equipment 102-21, 102-22, ..., 102-2n on the remote side has similar identification numbers respectively, there is no equipment connected to CONTIN and CONTOUT of the external interface portion 171. The remote side line switching equipment 102-21, 102-22, ..., 102-2n is controlled through corresponding ISDN lines 40-1, 40-2, ..., 40-n by the local side line switching equipment 102-11, 102-12, ..., 102-1n which recognize the identification numbers of the remote side line switching equipment within the receive data (RD) from the external control device 50. Transmission of control signals for back up control between line switching equipment on the local and remote sides and test result data obtained by the modem testers are performed in the control channel region of 1.2 Kbps for control/management information provided in the B channel frame separately from the data channel for data communication under control of the terminal adapter portion 14, as shown in FIGS. 3a, 3b and 3c and FIG. 7.

A connection of the personal line 30 and the ISDN line 40 through the line switching equipment 102-1 and 102-2 during test will be described with reference to FIGS. 10a, 10b, 11a and 11b.

The line test portion 18 and the external test device 60 connected to the external test interface portion 190 have modem test functions, transmit/receive test data such as "511PN" data and reference the data to detect failure of respective lines and circuits. It is possible to set returning test data in the loop back circuit of the test switching circuit 19 and the ISDN interface circuit (INF) of the terminal adapter portion 14. Control/management information such as a loop back setting instruction between the opposing line switching equipment 102-1 and 102-2, test data send instruction, reference result notice, etc., are transmitted through the control channel of the ISDN line 40.

FIG. 10a shows a loop back test on the side of the personal line 30. The line test portion 18 of the line switching equipment 102-1 or the external tester 60 sends "511PN" data which is referenced with the returned data at the DCE (MODEM) 31-1 or the test switching circuit 19 of the corresponding line switching equipment 102-2. The line test portion 18 sends a result of the reference to the control portion 17.

FIG. 10b shows a through-test on the side of the personal line 30. The corresponding line switching equipment 102-1 and 102-2 sends "511PN" data mutually and reference with data received from the other. A result of the reference on the side of the line switching equipment 102-2 is indicated through the ISDN line 40 to the control portion 17 of the line switching equipment 102-1.

FIG. 11a shows a loop back test on the side of the ISDN line 40. The line switching equipment 102-1 sends "511PN" data and references it with data returned at its own terminal adapter 14 or the terminal adapter portion 14 of the corresponding line switching equipment 102-2.

FIG. 11b shows a through-test on the side of the ISDN line 40. The line switching equipments 102-1 and 102-2 send "511PN" data through the data channel of the ISDN line 40, mutually, and reference them with data from the other. A result of the reference on the side of the line switching equipment 102-2 is indicated through the ISDN line 40 to the line switching equipment 102-1.

Now, a method for automatically providing a trigger for line switching and recovery without the necessity of intervention of an operator will be described.

When automatic line switching and recovery is to be performed, this control portion 17 is preliminarily of this fact.

The DCE interface portion 13 includes a monitor circuit 130 which monitors the state of communication through the personal line 30 and detects communication failure, as shown in FIGS. 5 and 6. When the monitor circuit 130 detects a communication failure, it informs the control portion 17 of the fact through a signal line, not shown. The control portion 17 responds to this information to control the terminal adapter portion 14 and the switching portion 16 to cause the DTE 20 to be switched to the side of the ISDN line 40 and display the fact while simultaneously controlling the line test portion 18 to cause the test of the personal line 30 to be repeated until the test result becomes preferable. When the test result becomes preferable due to removal of the failure on the personal line 30, it controls the switching portion 16 to return the DTE 20 to the personal line 30 side.

As described above, since the line switching equipment of the second and third embodiments, shown in FIGS. 5 and 6, respectively, include, in addition to the terminal adapter portion and the control portion of the line switching equipment of the first embodiment, the line test portion for testing the personal line and the ISDN line and the switching portion, the second and third embodiments have, in addition to the effects obtainable by the first embodiment, effects that make it possible to easily perform a line test for the side of either the personal line or the ISDN line, whichever is off-lined even when on-line data communication is being performed on either the personal line side or the ISDN line side, without degrading the quality of the on-line data communication and without disconnecting the data terminal device, data line terminating device and/or ISDN line from the system every time the test is performed. Further, a single tester of the line test portion (or external line test means) can be used for both the personal line test and the ISDN line test.

Further, by providing an external control interface portion capable of being cascade-connected to other line switching equipment to the control portion, it is possible to easily perform control of all line switching equipment and a line test on the personal line side by using a single external control device even when the system constitutes a plurality of line switching equipment pairs.

Although the present invention has been described with reference to specific embodiments, this description is not meant to be construed in a limiting sense. Various modifications of the disclosed embodiments, as well as other embodiments of the present invention, will become apparent to persons skilled in the art upon reference to the description of the present invention. It is therefore contemplated that the appended claims will cover any modifications or embodiments as fall within the true scope of the present invention.

What is claimed is:

1. Line switching equipment comprising:
   DTE interface means connected to a data processing unit;
   DCE interface means connected to a data line terminating service of a personal line;
   terminal adapter means connected to an ISDN line for performing call sending control and call receiving control with respect to said ISDN line and performing interface conversion between input signals thereto and output signals therefrom;
   switching means for selectively connecting said DTE interface means to either said DCE interface means or said terminal adapter means; and
   control means, responsive to an externally inputted signal and a control signal supplied from said ISDN line through said terminal adapter means, for controlling operations of said terminal adapter means and said switching means to send a confirmation signal associated with said control signal to said ISDN line through said terminal adapter means.

2. Line switching equipment comprising:
   DTE interface means connected to a data processing unit;
   DCE interface means connected to a data line terminating device of a personal line;
   terminal adapter means connected to an ISDN line for performing call sending control and call receiving control with respect to said ISDN line and performing interface conversion between input signals thereto and output signals therefrom;

line test means for performing a test of said personal line through said DCE interface means and a test of said ISDN line through said terminal adapter means;

switching means including a first switch circuit for selectively connecting said DTE interface means to either said DCE interface means or said terminal adapter means and a second switch circuit for selectively connecting said line test means to either said DCE interface means or said terminal adapter means; and control means, responsive to an externally inputted signal and a control signal supplied from said ISDN line through said terminal adapter means, for controlling operations of said terminal adapter means, said line test means and said switching means to send a confirmation signal associated with said control signal to said ISDN line through said terminal adapter means.

3. Line switching equipment claimed in claim 1, wherein said terminal adapter means separates a frame structure of a B channel of a basic interface of said ISDN line into a data channel region and a control channel region, data of said data processing unit being transmitted or received in said data channel region and said control signal of said control means being transmitted or received in said control channel region.

4. Line switching equipment claimed in claim 2, further comprising a test device switching circuit responsive to said control means to selectively connect said second switch circuit of said switching means to either an external test interface means for connecting an external line test means or for internally connecting said line test means.

5. Line switching equipment claimed in claim 2, wherein said control means includes;

a control portion;

an operation portion for inputting said externally inputted signal by manual operation of a key switch; and an external control interface portion for inputting said externally inputted signal from an external control device.

6. Line switching equipment claimed in claim 5, wherein said external control interface portion of said control means includes;

a connecting circuit for a forward stage;

a connecting circuit for a rearward stage; and a signal control circuit for distributing a signal from said forward stage connecting circuit to said control portion and said rearward stage connecting circuit, for performing an OR operation of a signal from said rearward stage connecting circuit with a signal from said control portion and outputting a signal resulting from said OR operation to said forward stage connecting circuit;

a cascade-connection to another line switching equipment is performed through said forward stage connecting circuit and said rearward stage connecting circuit for transmitting or receiving a signal with respect to said external control device according to a preliminarily assigned identification number.

7. Line switching equipment claimed in claim 6, wherein said control means transfers said signal from said external control device through said terminal adapter portion and said ISDN line to another oppositely located line switching equipment through said personal line when said control means recognizes that an identification number of a designation of said signal is an identification number of said another line switching equipment.

8. Line switching equipment claimed in claim 2, further comprising:

a first data returning circuit provided between said switching portion and said line test portion; and a second data returning circuit provided between said terminal adapter portion and said ISDN line.

9. Line switching equipment claimed in claim 2, wherein said DCE interface means comprises a monitor circuit for monitoring a state of communication using said personal line of said data processing unit and for informing said control means of detection of a communication failure when said communication failure is detected thereby, and wherein said control means, upon receiving information of said communication failure, controls said terminal adapter means and said switching means to connect said DTE interface means to said terminal adapter means, controls said line test means to perform a test of said personal line and controls said switching means to connect said DTE interface means to said DCE interface means when a result of said test is preferable.

* * * * *